United States Patent [19]

Yamamoto et al.

[11] 4,057,507

[45] Nov. 8, 1977

[54] EUROPIUM AND SAMARIUM ACTIVATED RARE EARTH OXYSULFIDE PHOSPHOR

[75] Inventors: Hajime Yamamoto, Kodaira; Tsuyoshi Kano, Higashiyamato; Masaki Nakano, Hamura, all of Japan

[73] Assignee: Hitachi, Ltd., Tokyo, Japan

[21] Appl. No.: 642,008

[22] Filed: Dec. 18, 1975

[30] Foreign Application Priority Data

Dec. 20, 1974 Japan .................. 49-145572

[51] Int. Cl.$^2$ ........................... C09K 11/46
[52] U.S. Cl. ..................... 252/301.4 S; 313/468
[58] Field of Search .............. 252/301.4 S, 301.4 R; 313/468

[56] References Cited

U.S. PATENT DOCUMENTS

| 2,462,547 | 2/1949 | Pitha et al. | 252/301.4 S |
|---|---|---|---|
| 2,522,074 | 9/1950 | Urbach | 252/301.4 S |
| 2,527,365 | 10/1950 | Leverenz | 252/301.4 S |
| 3,418,246 | 12/1968 | Royce | 252/301.4 S |
| 3,655,577 | 4/1972 | Kano et al. | 252/301.4 S |
| 3,706,666 | 12/1972 | Schvil | 252/301.4 S |
| 3,868,533 | 2/1975 | Schvil | 252/301.4 S X |

*Primary Examiner*—Jack Cooper
*Attorney, Agent, or Firm*—Birch, Stewart, Kolasch and Birch

[57] ABSTRACT

Rare earth oxysulfide phosphors consisting essentially of a compound of a general formula, $\{(Y_u Gd_{1-u})_{1-x-y-z}Eu_xSm_y(Tb_{1-p}Pr_p)_z\}_2 \cdot O_2S$, wherein $0 \leq z \leq 1 \times 10^{-4}$, $0 \leq p \leq 1$, $0 \leq u \leq 1$, and $x$ and $y$ satisfy the area B, defined by a, b, c and d of FIG. 5.

These phosphors are well adapted for use in a color television picture tube.

6 Claims, 5 Drawing Figures

EUROPIUM AND SAMARIUM ACTIVATED RARE EARTH OXYSULFIDE PHOSPHOR

BACKGROUND OF THE INVENTION

The present invention relates to phosphors, and more particularly to improvements in red color - luminescent phosphors consisting essentially of rare earth oxysulfides activated with a trivalent europium, said phosphors being well adapted for use in a color television picture tube.

As is well known, a yttrium oxysulfide phosphor activated with europium is excellent as a red-color phosphor for use in a color television picture tube and hence finds a wide range of application in this field.

Japanese Pat. No. 537954 (Japanese Patent Publication No. Sho 43-21859) and U.S. Pat. No. 3,706,666 disclose such phosphors and their analogous materials, which contain oxychalcogenides of at least one member of a group consisting of yttrium and gadolinium, in addition to from 0.0002 to 0.2 mol of one member of a group consisting of europium, samarium, terbium and thulium, In addition, it is known that the cathode-ray luminescent intensity is remarkably increased by adding up to 40 ppm of terbium or 100 ppm of praseodymium to the aforesaid phosphors, particularly, to yttrium and/or gadolinium oxysulfide activated with europium. Meanwhile, improvements in performance of phosphors for use in a color television are one of the important targets in this technology, which may provide economic advantages. Particularly, there has been a demand for improving yttrium oxysulfides activated with europium, which finds a wide range of application. As a result, it has been long desired to provide phosphors of this kind, which are lower in cost and higher in performance. Europium is a precious element which is not abundantly found among the rare earth elements, so that reduction in the amounts of europium without lowering the performance of phosphors would be of significant economic consequence.

SUMMARY OF THE INVENTION

It is an object of the present invention to provide phosphors which may improve the color and luminescent intensity of oxysulfide phosphors of rare earth elements activated with europium and which are less expensive to produce.

The aforesaid object may be attained by substituting part of europium, which is an activator, with samarium in a precisely controlled amount.

Included by the aforesaid oxysulfide phosphors of rare earth elements activated with the aforesaid europium are yttrium and/or gadolinium oxysulfide phosphors activated with europium, and phosphors of a known type, which contain at least one material of less than 100 ppm praseodymium and terbium.

The phosphors according to the present invention, in which part of europoium of a known type is substituted with samarium, may be expressed by the following general formula, $\{(Y_u Gd_{1-u})_{1-x-y-z}Eu_xSm_y(Tb_{1-p}Pr_p)_z\}_2 \cdot O_2S$, wherein $0 \leq i z \leq 1 \times 10^{-4}, 0 \leq p \leq 1, 0 \leq u \leq 1$, and $x$ and $y$ satisfy the area B of FIG. 5, defined by $a, b, c,$ and $d$ to be described hereinafter.

DESCRIPTION OF THE PREFERRED EMBODIMENTS

For better understanding of the preferred embodiments of the present invention, description will be given in conjunction with the accompanying drawings, hereunder.

Figure 1:
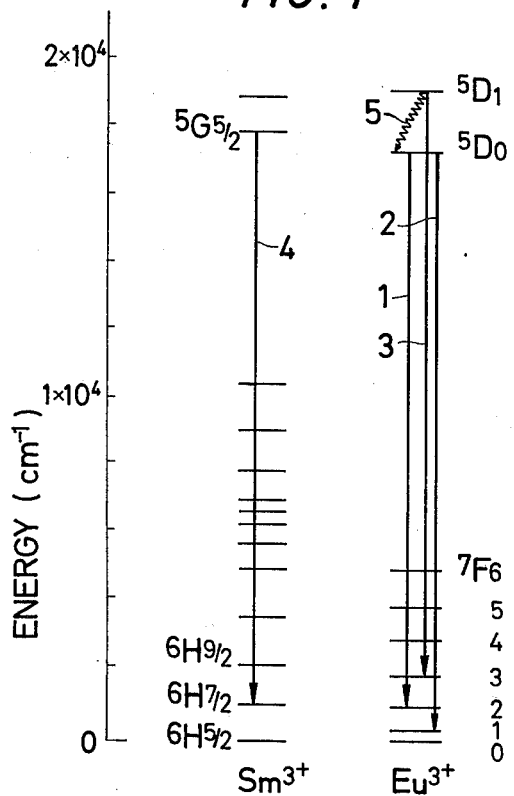
FIG. 1 shows the energy levels of trivalent europium and samarium.

FIG. 1 shows the energy levels of trivalent europium as an activator and trivalent samarium as a dopant. Arrows 1, 2 and 3 represent the typical radiation transition in europium, while an arrow 4 represents the transition which may be well observed in samarium. An arrow 5 denotes the non-radiative transition. In the practical concentration range of europium, i.e., from 0.032 to 0.042 in terms of the atomic ratio to the total cation, there exist two types of emissions accruing from two excited states (5D0, 5D1 ). Among this, the red emission which is useful for the color television is produced in the lowest excited state (5D0), and follows the transitions shown at 1, 2. On the other hand, the emissions accruing in a higher excited state than shown at 3 are orange and green, which impair the color. Accordingly, if the luminescent intensity of emission in the excited state (5D1) is selectively reduced, for instance, if the non-radiative transistion from the states 5D1 to 5D0 is enhanced as shown by an arrow 5, then a relative red component is intensified, and the color may be improved. The present invention utilizes the cross relaxation or interaction between samarium as a dopant and europium for achieving the aforesaid phenomenon. Stated otherwise, the coulomb interaction between the two enhances the relaxation from 5D1 to 5D0, and at the same time samarium receives the aforesaid relaxation energy and is excited from the ground state (6H5/2) to the immediately above state (6H7/2). The reason why samarium is adopted for achieving the aforesaid interaction are (i) that the energy levels of the aforesaid two states are relatively close to each other and hence there is a large possibility of interaction, and (ii) that the strongest emission of samarium itself is a red emission due to the transition shown by an arrow 4 in FIG. 1, and the red emission is also useful.

Figure 2:
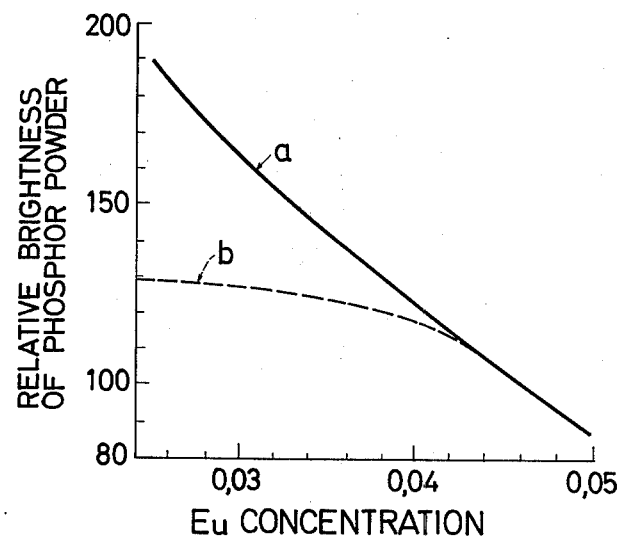
FIG. 2 is a graph showing the relationship between the concentration or europium and the brightness of phosphor powder.

FIG. 2 shows the relative brightness of phosphor powder activated only with europium as a function of the concentration of europium. Curve $a$ (the solid line) represents data measured on the emission in the entire wave length range, while curve $b$ (the broken line) represents the data measured with respect only to the red luminescent component by an illuminometer having a spectral sensitivity approximating a luminosity curve, with the aid of a cut filter VR-60. The smaller the difference between the curves $b$ and $a$, the better will be the purity of the red color. As can be seen from the figure, the color is improved by sacrificing the brightness of the red emission. (Compare the brightness in the concentration range (atomic ratio of 0.0027), in which the red emission is at the maximum, with the brightness in the ordinary, practical concentration (for instance, atomic ratio of 0.043)). Thus, if the concentration of europium is reduced to the concentration, at which the brightness of red emission is at its maximum, and then a suitable amount of samarium is added to europium to selectively reduce the emission in the state 5D1, then the color and brightness should be further improved in principle.

Figure 3:
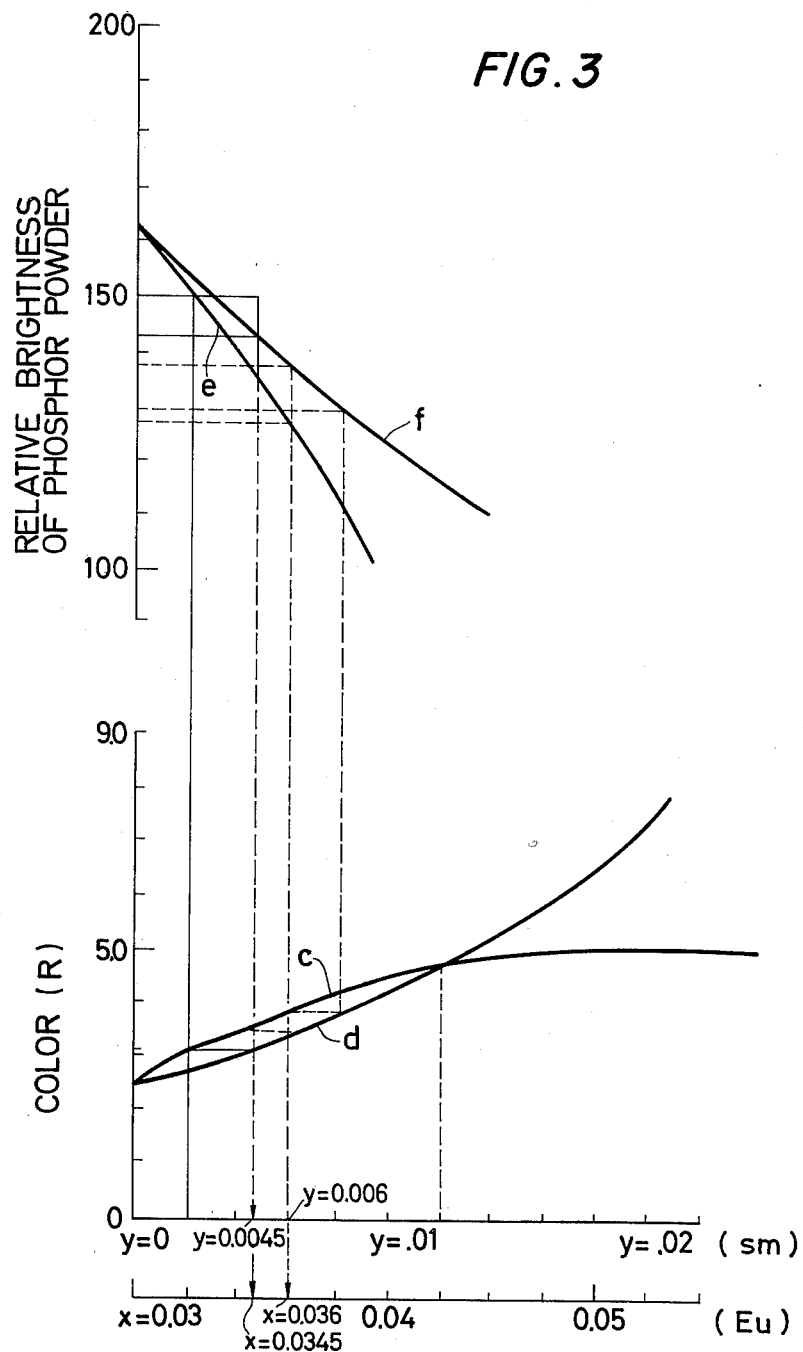
FIG. 3 is a graph showing the influence of doping of samarium on the brightness and color of phosphors activated with europium.

FIG. 3 is illustrative of the effects of samarium, which is added to yttrium oxysulfide activated with europium. In this figure, curve $c$ represents the relationship between the color and the amount of samarium added, in the case samarium of $y$ mol is added to europium of a given concentration (atomic ratio of 0.03), while curve $e$ represents the relationship between the amount of samarium added and the relative brightness in the same sample as that used for the curve $c$. In addition, curves $d$ and $f$ represent the relationships between the color brightness and the concentration of europium in yttrium oxysulfide phosphor activated with only europium, without adding samarium, respectively. On the other hand, terbium was added to all of the samples in an amount of $1.4 \times 10^{-5}$ mol. Taken as a measure of the color is a ratio $R = \{I(5D0 \rightarrow 7F1)/I(5D1 \rightarrow 7F3)\}$ at the peak height, of the emission line (5D0 − 7F1 transition) in the state 5D0 of a peak wave length of 595 m$\mu$ to the emission line (5D1 → 7F3 transition) in the emission state 5D1 of a peak wave length of 585 m$\mu$. The greater the ratio R at the peak height, the more the red luminescent component, and thus the higher will be the color purity of the red emission. As can be seen from the drawing, the color of the phosphors having samarium of an amount ($y$) in the range of $0 < y \leq 0.012$, particularly $5 \times 10^{-4} \leq y \leq 0.01$, is superior to the color of a phosphor activated only with europium. It follows from this that there may be achieved improvements in the color of red emission in the compositional range of phosphors, which range presents the high luminescent intensity afforded by yttrium oxysulfide doped with europium, by substituting part of europium with samarium of a given amount. For instance, a sample, to which has been added samarium of $y = 0.0045$, is substantially equivalent in the color and brightness to the sample doped only with europium, i.e. that with an europium concentration of $0.03 + 0.006 = 0.036$. As can be seen from the drawing, in the case of $y \leq 0.0045$, the sample, to which samarium has been added, is always higher in brightness than a sample doped only with europium. For instance, the sample of $y = 0.002$ provides a relative brightness of 150, while the sample doped only with europium and having the same color presents the brightness of about 143.

Stated otherwise, in the range of $0 < y \leq 0.0045$, part of costly europium may be substituted for samarium, while maintaining the performance of the phosphors equivalent to or better than the performance of a phosphor activated only with europium. Even in case the samarium concentration exceeds $y = 0.0045$, there results a minor reduction in brightness, as compared with the brightness of a sample activated only with europium having the same color. For instance, the brightness of the sample, to which has been added samarium of $y = 0.006$, is only 2% lower than the sample (concentration of 0.038) activated only with europium and having the same color. It can be concluded that the practical range of the concentration of samarium is up to $y = 0.006$. On the other hand, the lower limit of $y$ is about 0.0005 in the practical application.

On the other hand, if the concentration of europium is lower than 0.03, the effective concentration range of samarium may become wider, while the practical color range thereof will be narrowed, with a resulting impaired color purity. If the concentration is higher than 0.03, then the above situation will be reversed.

Figure 5:
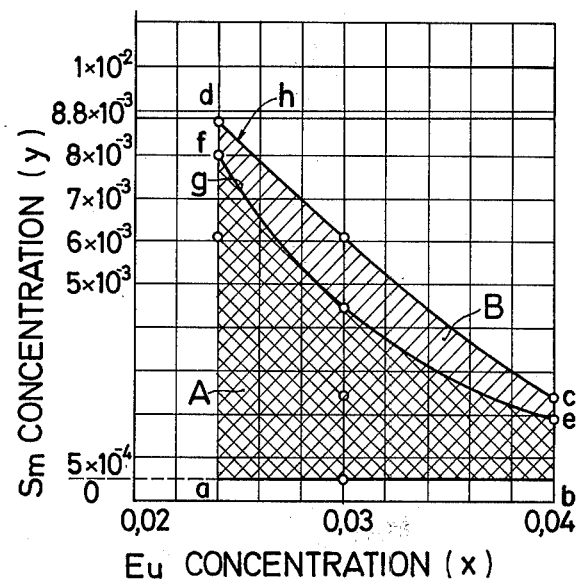
FIG. 5 is a plot showing the areas of the optimum concentrations of europium and samarium.

FIG. 5 shows the relationship between the preferred the preferred amount ($x$) of europium and amount ($y$) of samarium, which relationship has been determined, based on the test results, taking into consideration the relationship between the brightness and the color. In other words, if $x$ and $y$ in the area B (including the area A completely) are suitably selected, the color is not impaired but equivalent to or better than the color of the sample activated only with europium, although the brightness of the sample is sometimes found to be lower than the brightness of the sample activated only with europium. In addition, if $x$ and $y$ in the most preferable zone A, defined by $a$, $b$, $e$ and $f$ are selected, then the color and brightness of a sample may be well comparable to or better than those of a sample doped only with europium.

The features of the present invention will be more clearly understood with reference to the following examples.

EXAMPLE 1

There was prepared yttrium oxysulfide ($Y_{0.965-5}Eu_{0.03}Sm_{0.0045}Tb_{1.4\times10^{-5}})_2O_2S$ containing europium (Eu) of the atomic ratio of 0.03, samarium (Sm) of the atomic ratio of 0.0045 and terbium (Tb) of the atomic ratio of $1.4 \times 10^{-5}$) to the total cation number, in the following manner.

72.67 g of $Y_2O_3$, 3.517 g of $Eu_2O_3$ and 0.523 g of $Sm_2O_3$ were dissolved in a nitric acid solution (167 cc of concentrated nitric acid was diluted with 380 cc of deionized water). Then, 0.374 g of $Tb_4O_7$ was dissolved into nitric acid to give 1 liter solution, after which 5 ml of the solution thus prepared was taken, and then added to the aforesaid mixed solution of $Y$, $Eu$ and $Sm$. On the other hand, 152 g of oxalic acid was dissolved into deionized water of 332 cc. The mixed solution of the aforesaid $Y$, $Eu$, $Sm$ and $Tb$ was warmed to about 85° C and then the aforesaid oxalic acid solution which was warmed to about 85° C was slowly added thereto, under agitation. The co-oxalic salt of $Y$, $Eu$, $Sm$ and $Tb$ thus precipitated was separated through a filter, rinsed with water and dried at about 120° C for 12 hours in the air. Then, the co-oxalic salt was placed in a quartz boat and heated at 800° C for 1 hour to oxidate the co-oxalic salt. Then, 22 g of oxide thus obtained, 6.5 g sodium carbonate, 6.5 g of sulfur and 1.8 g of potassium phosphate were placed in a polyethylene bottle and agitated for mixing. Then, the mixture thus obtained was placed in a quartz crucible of about 35 cc and baked at 1150° C for 3 hours in the air. The post-treatment after the baking was carried out as follows:

The mixture thus baked was placed into a polyethylene bottle, and glass balls of a diameter of about 5 mm and water of a suitable amount were added thereto, followed by mixing in a wet type ball mill for about 10 minutes. Then, the mixture was passed through a screen of 325 mesh and then 0.5% concentrated hydrochloric acid solution was added thereto, and then the mixture was placed in the polyethylene bottle again and agitated for about 10 minutes.

Figure 4:
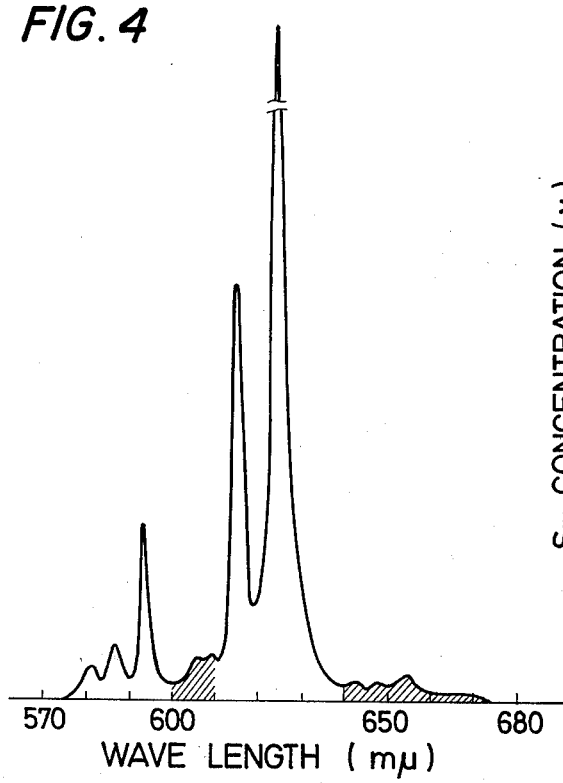
FIG. 4 is the luminescence spectra of samples which have been doped with samarium.

The product thus obtained was separated according to decantation, and rinsing was repeated with deionized water, until the pH of supernatant liquid becomes over 5.2 pH. Finally, the product was separated through a filter and then dried at 120° C for about 2 hours in the air. In this manner, phosphors of an intended composition were obtained. FIG. 4 shows luminescence spectra of phosphor thus obtained, when excited by electron beam of 10 KV. The hatched portion represents the emission produced by $Sm^{3+}$.

Taken as a measure of color was the ratio in the peak height, (This will be referred to simply as R, hereinafter), of the emission line (5D0 − 7F1 transition) of peak wave length of 595 m$\mu$ to the emission line (5D1 − 7F3 transition) of the peak wave length of 585 m$\mu$. Assume that R represents $\{I(5D0 - 7F1)/I(5D1 - 7F3)\}$, the value R of phosphor according to this example was found to be 3.45 which is equivalent to the value of phosphor activated only with europium $(Y_{0.964}Eu_{0.036}Tb_{1.4\times10^{-5}})_2O_2S$, which was prepared according to the aforesaid procedure. On the other hand, the relative brightness of the two phosphors was found to be equal.

The samples to be described hereinafter were obtained according to the procedure taken in Example 1. Table 1 shows the compositions and characteristics of the samples including those given in Example 1. In this table 1, there are shown values $u$, $x$, and $y$ of phosphor expressed by the general formula, $$\{(Y_uGd_{1-u})_{1-x-y-z}Eu_xSm_yZb_z\}_2O_2S \ldots (1)$$

, wherein $z = 1.4 \times 10^{-5}$, and Eu concentration $x'$, the color measure R of the phosphor,
$$\{Y_uGd_{1-u})_{1-x'-z}Eu_{x'}Tb_z\}_2O_2S \ldots (2),$$

which is activated only with Eu and has the same color as that of the aforesaid firstly referred phosphor, in addition to an increase and decrease in the brightness, in comparison of the former (1) with the latter (2).

Table 1

| Sample No. | u | x | y | x' | Measure of color (R) | Brightness |
|---|---|---|---|---|---|---|
| 11 | 1 | .03 | .0025 | .0345 | 3.2 | +3% |
| 12 | 1 | .03 | .0045 | .036 | 3.4 | equivalent |
| 13 | 1 | .03 | .006 | .038 | 3.7 | −2% |
| 14 | 1 | .03 | .0005 | .0315 | 2.6 | +2% |
| 15 | 1 | .04 | .002 | .043 | 4.8 | equivalent |
| 16 | 1 | .04 | .0025 | .0435 | 5.0 | −1% |
| 17 | 1 | .024 | .008 | .035 | 3.2 | equivalent |
| 18 | 1 | .024 | .0088 | .0377 | 3.4 | −1% |
| 19 | 1 | .024 | .006 | .033 | 2.8 | +8% |
| 20 | 0 | .03 | .0045 | .036 | 3.4 | equivalent |
| 21 | .8 | .03 | .0045 | .036 | 3.4 | equivalent |

The comparison of $x$ with $x'$ shows that, for obtaining the same color, the amount of Eu in the case of using a combination of Eu and Sm is less than that of Eu in the case of using Eu alone. On the other hand, the brightness is maintained equivalent or improved, although the brightness is lowered as low as 2% in some cases, with the color maintained unchanged. The color is improved with an increase in the value R. However, R no less than 2.6 is sufficient for the practical application. This is because the phosphors according to the present invention, which give $R = 2.6$, provide the color substantially the same as that of yttrium oxysulfide activated only with europium which is finding a wide practical application. FIG. 5 shows the relationship between the temperatures and characteristics of europium and samarium which were obtained from the aforesaid examples. In this figure, a curve g represents the composition which provides the color and brightness equivalent to those of phosphor activated only with europium, while a curve h represents the composition which provides the color equivalent to that of phosphor activated only with europium but provides the brightness which has been lowered by 1 to 2% relatively.

As can be seen from the aforesaid examples, the values $x$ and $y$, which provide the color and brightness of phosphor activated only with europium, afford the upper limit of the most preferable concentration range, while the values $x$ and $y$, which provide the equivalent color but the brightness lowered by 1 to 2%, afford the upper limit of the second most preferable concentration range. The curves g and h represent the aforesaid upper limits in FIG. 5. On the other hand, the lower limit is $y = 0.0005$, as has been described earlier. On the other hand, the preferable range of europium should meet two requirements, i.e., (i) $y$ is existent in principle, and (ii) the color is useful as red in the practical application. Thus, $0.024 \leq x \leq 0.04$. As a result, the preferable concentration range according to the present invention should be the area B shown in FIG. 5, i.e., the area defined by $5 \times 10^{-4} \leq y \leq$ curve h and $0.024 \leq x \leq 0.04$, further preferably, the area A having the upper limit defined by the curve g for $y$.

EXAMPLE 2

The same procedure as that in Example 1 was followed, except that 0.165 g of $Pr_6O_{11}$ was used in place of $Tb_4O_7$, thereby obtaining yttrium oxysulfide $(Y_{0.9655}Eu_{0.03}Sm_{0.0045}Pr_{7\times10^{-6}})_2O_2S$ which contains europium of an atomic ratio of 0.03, 0.0045 g of samarium $(Sm)$ of an atomic ratio of 0.0045, and $7 \times 10^{-6}$ praseodymium $(Pr)$ to the total cation number.

The value $R$ and relative brightness of phosphors obtained according to Example 2 were found to be the same as those given in Example 1.

EXAMPLE 3

The same procedure as that in Example 1 was followed, except that the amount of $Tb_4O_7$ used in Example 1 was changed to 0.187 g, and 0.082 g of $Pr_6O_{11}$ was dissolved into nitric acid to give one liter of solution, after which 5 ml of the aforesaid diluted solution was taken to add same to the mixture solution. Thus, phosphor, $(Y_{0.9655}Eu_{0.03}Sm_{0.0045}Tb_{7\times10^{-6}}PR_{3.5\times10^{-6}})_2O_2S$ was obtained.

The value R and relative brightness of phosphors obtained according to Example 3 were found to be the same as those given in Example 1.

What is claimed is:

1. A rare earth oxysulfide phosphor consisting essentially of a compound of the general formula,
$$\{Y_u\ Gd_{1-u}\}_{1-x-y-z}Eu_xSm_y(Tb_{1-p}\ Pr_p)_z\}_2\ O_2S,$$
wherein $0 \leq z \leq 1 \times 10^{-4}$, $0 \leq p \leq 1$, $0 \leq u \leq 1$, and $x$ and $y$ satisfy the area B of FIG. 5 defined by $a$, $b$, $c$ and $d$.

2. A rare earth oxysulfide phosphor as defined in claim 1, wherein $x$ and $y$ in said general formula fall in the area A defined by $a$, $b$, $e$, and $f$ of FIG. 5.

3. A rare earth oxysulfide phosphor as defined in claim 2, wherein $u$ in said general formula is 1.

4. A rare earth oxysulfide phosphor as defined in claim 2, wherein $p$ in said general formula is 0.

5. A rare earth oxysulfide phosphor as defined in claim 1, wherein $u$ in said general formula is 1.

6. A rare earth oxysulfide phosphor as defined in claim 1, wherein $p$ in said general formula are 0.

* * * * *